(12) United States Patent
Otsuka et al.

(10) Patent No.: US 11,971,602 B2
(45) Date of Patent: Apr. 30, 2024

(54) LENS BARREL AND IMAGING DEVICE

(71) Applicant: FUJIFILM Corporation, Tokyo (JP)

(72) Inventors: Shinji Otsuka, Saitama (JP); Yukihiro Kaneko, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 741 days.

(21) Appl. No.: 17/117,640

(22) Filed: Dec. 10, 2020

(65) Prior Publication Data

US 2021/0096320 A1 Apr. 1, 2021

Related U.S. Application Data

(63) Continuation of application No. PCT/JP2019/022369, filed on Jun. 5, 2019.

(30) Foreign Application Priority Data

Jun. 29, 2018 (JP) .................. 2018-124906

(51) Int. Cl.
*G02B 7/08* (2021.01)
*G02B 7/09* (2021.01)
(Continued)

(52) U.S. Cl.
CPC .................. *G02B 7/08* (2013.01); *G02B 7/09* (2013.01); *G03B 5/00* (2013.01); *H02K 41/0354* (2013.01);
(Continued)

(58) Field of Classification Search
CPC . G02B 7/08; G02B 7/09; G02B 7/105; G03B 5/00; G03B 2205/0069; H04N 23/50; H02K 41/0354
(Continued)

(56) References Cited

U.S. PATENT DOCUMENTS 7,990,463 B2 * 8/2011 Ho .................. G02B 7/102
348/374
2010/0232044 A1 9/2010 Sato
(Continued)

FOREIGN PATENT DOCUMENTS

CN 101118309 A 2/2008
CN 101131526 A 2/2008
(Continued)

OTHER PUBLICATIONS

International Search Report issued in PCT/JP2019/022369; dated Sep. 3, 2019.
(Continued)

*Primary Examiner* — Stephone B Allen
*Assistant Examiner* — Leonidas Boutsikaris
(74) *Attorney, Agent, or Firm* — Studebaker & Brackett PC

(57) ABSTRACT

There are provided a lens barrel and an imaging device that can fix a movable member to a stationary frame without providing a member for fixing the movable member. The lens barrel includes a first motor (56) that drives a third front lens group-holding frame (24B) by first magnets (56A) provided on the third front lens group-holding frame (24B) and a first coil (56C), and a second motor (58) that drives a fourth lens group-movable holding frame (26B) by second coils (58A) provided on the fourth lens group-movable holding frame (26B) and second magnets (58B) provided on a fourth lens group base-holding frame (26A) fixed to the stationary barrel (12) and the cam barrel (14). The third front lens group-holding frame (24B) is fixed by a magnetic force between the first magnets (56A) and inner and outer yokes (58C, 58D) provided on the fourth lens group base-holding frame (26A) in a case where the application of current to the first coil (56C) is stopped.

6 Claims, 12 Drawing Sheets

(51) Int. Cl.
   *G03B 5/00* (2021.01)
   *H02K 41/035* (2006.01)
   *H04N 5/225* (2006.01)
   *H04N 23/50* (2023.01)

(52) U.S. Cl.
   CPC ..... *H04N 23/50* (2023.01); *G03B 2205/0069* (2013.01)

(58) Field of Classification Search
   USPC .......................................................... 359/819
   See application file for complete search history.

(56) References Cited

U.S. PATENT DOCUMENTS

| | | | |
|---|---|---|---|
| 2014/0125824 A1 | 5/2014 | Takizawa | |
| 2015/0002702 A1 | 1/2015 | Hu et al. | |
| 2017/0085799 A1* | 3/2017 | Yoshida | H04N 23/60 |
| 2017/0280036 A1* | 9/2017 | Morinaga | H04N 23/54 |
| 2018/0052298 A1* | 2/2018 | Sueoka | G02B 7/08 |
| 2018/0325547 A1* | 11/2018 | Bagwell | A61B 17/3476 |

FOREIGN PATENT DOCUMENTS

| | | |
|---|---|---|
| CN | 101750709 A | 6/2010 |
| CN | 102221764 A | 10/2011 |
| CN | 102590979 A | 7/2012 |
| JP | 2002-023037 A | 1/2002 |
| JP | 2005-141188 A | 6/2005 |
| JP | 2013-025081 A | 2/2013 |
| JP | 2013-045078 A | 3/2013 |
| JP | 2013-182165 A | 9/2013 |
| JP | 2013182165 A * | 9/2013 |
| JP | 2018-066915 A | 4/2018 |
| WO | 2012/107965 A1 | 8/2012 |
| WO | 2016/199284 A1 | 12/2016 |

OTHER PUBLICATIONS

Written Opinion issued in PCT/JP2019/022369; dated Sep. 3, 2019.
An Office Action mailed by China National Intellectual Property Administration dated Aug. 3, 2021, which corresponds to Chinese Patent Application No. 201980035009.7 and is related to U.S. Appl. No. 17/117,640; with English language translation.
An Office Action mailed by China National Intellectual Property Administration dated Nov. 18, 2021, which corresponds to Chinese Patent Application No. 201980035009.7 and is related to U.S. Appl. No. 17/117,640; with English language translation.
Notification of Completion of Formalities for Registration and Notification of Grant of Invention Patent mailed by China National Intellectual Property Administration dated Feb. 9, 2022, which corresponds to Chinese Patent Application No. 201980035009.7 and is related to U.S. Appl. No. 17/117,640; with English language translation.

* cited by examiner

LENS BARREL AND IMAGING DEVICE

CROSS-REFERENCE TO RELATED APPLICATIONS

The present application is a Continuation of PCT International Application No. PCT/JP2019/022369 filed on Jun. 5, 2019 claiming priority under 35 U.S.C § 119(a) to Japanese Patent Application No. 2018-124906 filed on Jun. 29, 2018. Each of the above applications is hereby expressly incorporated by reference, in its entirety, into the present application.

BACKGROUND OF THE INVENTION

1. Field of the Invention

The present invention relates to a lens barrel and an imaging device, and more particularly, to a lens barrel and an imaging device that fix and hold a movable member provided in the lens barrel in a case where power is turned off.

2. Description of the Related Art

Since a movable member provided in the imaging device is fixed and held in a case where the power of an imaging device is turned off, the inadvertent movement of the movable member is suppressed.

For example, JP2013-045078A discloses a lens barrel that includes a locking magnet provided on a lens barrel body and a locking magnetic body provided on a lens holder and fixes and holds the lens holder on the lens barrel body in a case where power is turned off.

SUMMARY OF THE INVENTION

In recent years, a lens and an actuator for driving the lens have been made small as a digital imaging device typified by a digital still camera or a digital video movie camera has been made compact or mobile. The lens barrel disclosed in JP2013-045078A needs to be provided with the locking magnet and the locking magnetic body to fix the movable member, and is desired to be further reduced in size.

The invention has been made in consideration of the above-mentioned circumstances, and provides a lens barrel and an imaging device that can fix a movable member to a stationary frame without providing a member for fixing the movable member.

In order to achieve the object of the invention, a lens barrel according to an aspect of the invention comprises: a stationary frame; a first movable frame that holds a first optical member and is supported by the stationary frame so as to be movable in a direction of an optical axis of the first optical member; a first drive unit of which a first magnet is provided on the first movable frame and a first coil is provided on the stationary frame and which moves the first movable frame in the direction of the optical axis of the first optical member; a second movable frame that holds a second optical member and is supported by the stationary frame so as to be movable in a direction of an optical axis of the second optical member or in a direction orthogonal to the optical axis; and a second drive unit of which a second coil is provided on the second movable frame and a second magnet is provided on the stationary frame and which moves the second movable frame in the direction of the optical axis of the second optical member or in the direction orthogonal to the optical axis. In a case where the first movable frame is moved to a moving end close to the second drive unit and application of current to the first coil is stopped, the first movable frame is fixed at the moving end by a magnetic force between the first magnet and a magnetic body of the second drive unit.

According to the invention, the first movable frame can be fixed at the moving end by a magnetic force between the first magnet provided on the first movable frame and the magnetic body provided in the second drive unit in a case where the application of current to the first coil is stopped, that is, power is in an OFF state. Accordingly, since the movement of the first movable frame in the stationary frame can be prevented even though power is turned off, it is possible to prevent the optical member from protruding due to the movement of the first movable frame in a case where power is turned off.

In the aspect of the invention, it is preferable that the first drive unit is a moving magnet type voice coil motor and the second drive unit is a moving coil type voice coil motor.

According to this aspect, since the second drive unit is formed of a moving coil type voice coil motor, the coil is lighter than the magnets. Accordingly, the second movable frame can be smoothly moved. Further, since the first drive unit is formed of a moving magnet type voice coil motor, the lens barrel can be made small.

In the aspect of the invention, it is preferable that the magnetic body of the second drive unit is a yoke to which the second magnet is fixed.

According to this aspect, since a yoke to which the second magnet is fixed is used as the magnetic body of the second drive unit, the first movable frame can be fixed without separately providing a fixing member.

In the aspect of the invention, it is preferable that the second movable frame is a barrel body supported by the stationary frame so as to be movable in the direction of the optical axis of the second optical member and having a cavity on a side thereof facing the first movable frame and the first movable frame enters the cavity of the second movable frame in a case where the first movable frame is moved to the moving end close to the second drive unit.

According to this aspect, since the second movable frame has a cavity on a side thereof facing the first movable frame, the first movable frame can be made to enter the cavity. Accordingly, the optical member provided on the first movable frame and the optical member provided on the second movable frame can be caused to be close to each other.

In the aspect of the invention, it is preferable that the second movable frame is supported by the stationary frame so as to be movable in the direction orthogonal to the optical axis of the second optical member and the second optical member is a camera shake-correcting lens.

According to this aspect, since the magnetic body provided to drive the camera shake-correcting lens and the first magnet provided on the first movable frame are fixed to each other, the first movable frame can be fixed.

In the aspect of the invention, it is preferable that the first movable frame is a barrel body and a plurality of the first magnets are arranged symmetrically with respect to a center of the first movable frame.

According to this aspect, since the first magnets are arranged symmetrically with respect to the center of the first movable frame, any one of the plurality of first magnets can be made close to the magnetic body of the second drive unit. Accordingly, the first movable frame can be fixed between the first magnets and the magnetic body of the second drive unit.

In the aspect of the invention, it is preferable that the second movable frame includes a balance weight on a side thereof facing the first movable frame, the balance weight is formed of a magnetic body, and the second movable frame is fixed by a magnetic force between the first magnet and the balance weight in a case where application of current to the first coil is stopped.

According to this aspect, since the second movable frame includes a balance weight on a side thereof facing the first movable frame, the center of gravity of the second movable frame can be moved to the first movable frame. Accordingly, the second movable frame can be stably moved. Further, since the balance weight is formed of a magnetic body, the balance weight of the second movable frame and the first magnet of the first movable frame can be fixed to each other. Accordingly, the first movable frame can be fixed to the stationary frame and the second movable frame can be fixed to the fixed first movable frame.

In the aspect of the invention, it is preferable that the stationary frame consists of a first frame body supporting the first movable frame and a second frame body supporting the second movable frame.

According to this aspect, since the stationary frame includes the first frame body and the second frame body, the first movable frame and the second movable frame can be moved relative to the first frame body and the second frame body. Accordingly, the moving distances of the first movable frame and the second movable frame can be adjusted.

In order to achieve the object of the invention, an imaging device according to another aspect of the invention comprises the lens barrel.

According to the invention, since the imaging device comprises the lens barrel, the first movable frame can be fixed in a case where power is turned off. Accordingly, damage to the optical members and the like can be prevented.

According to the lens barrel of the aspect of the invention, since the first magnet and the magnetic body of the second drive unit can be attracted to each other by a magnetic force in a case where the application of current to the first coil is stopped, the first movable frame can be fixed to the stationary frame. Accordingly, since the movement of the first movable frame can be prevented while the lens barrel and the imaging device are transported, damage to the optical members and the like can be prevented.

DESCRIPTION OF THE PREFERRED EMBODIMENTS

A lens barrel and an imaging device according to embodiments of the invention will be described below with reference to the accompanying drawings.

[Configuration of Lens Barrel]

Figure 1:
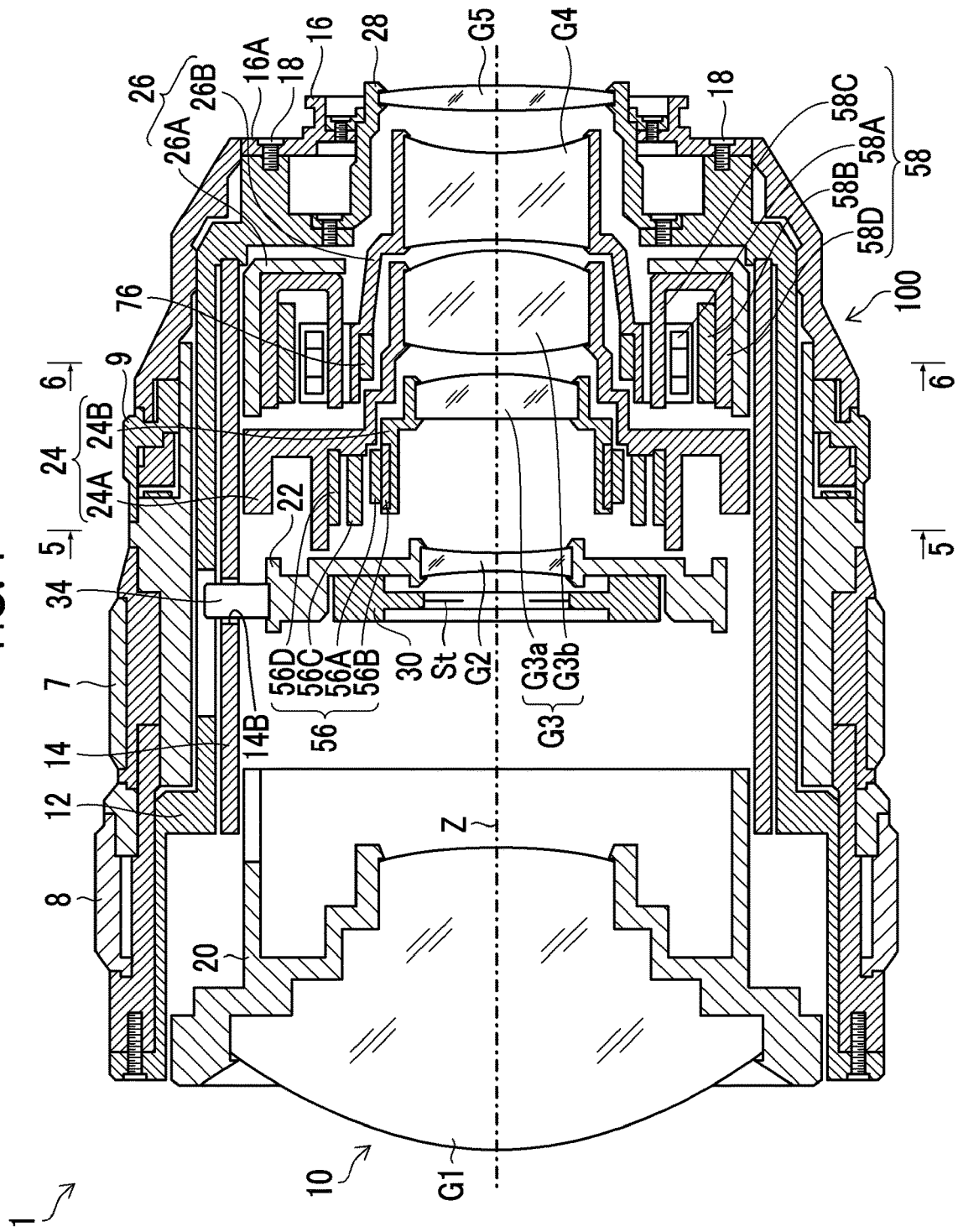
FIG. 1 is a side cross-sectional view showing the schematic configuration of the inside of a lens barrel at a wide-angle end.
Figure 2:
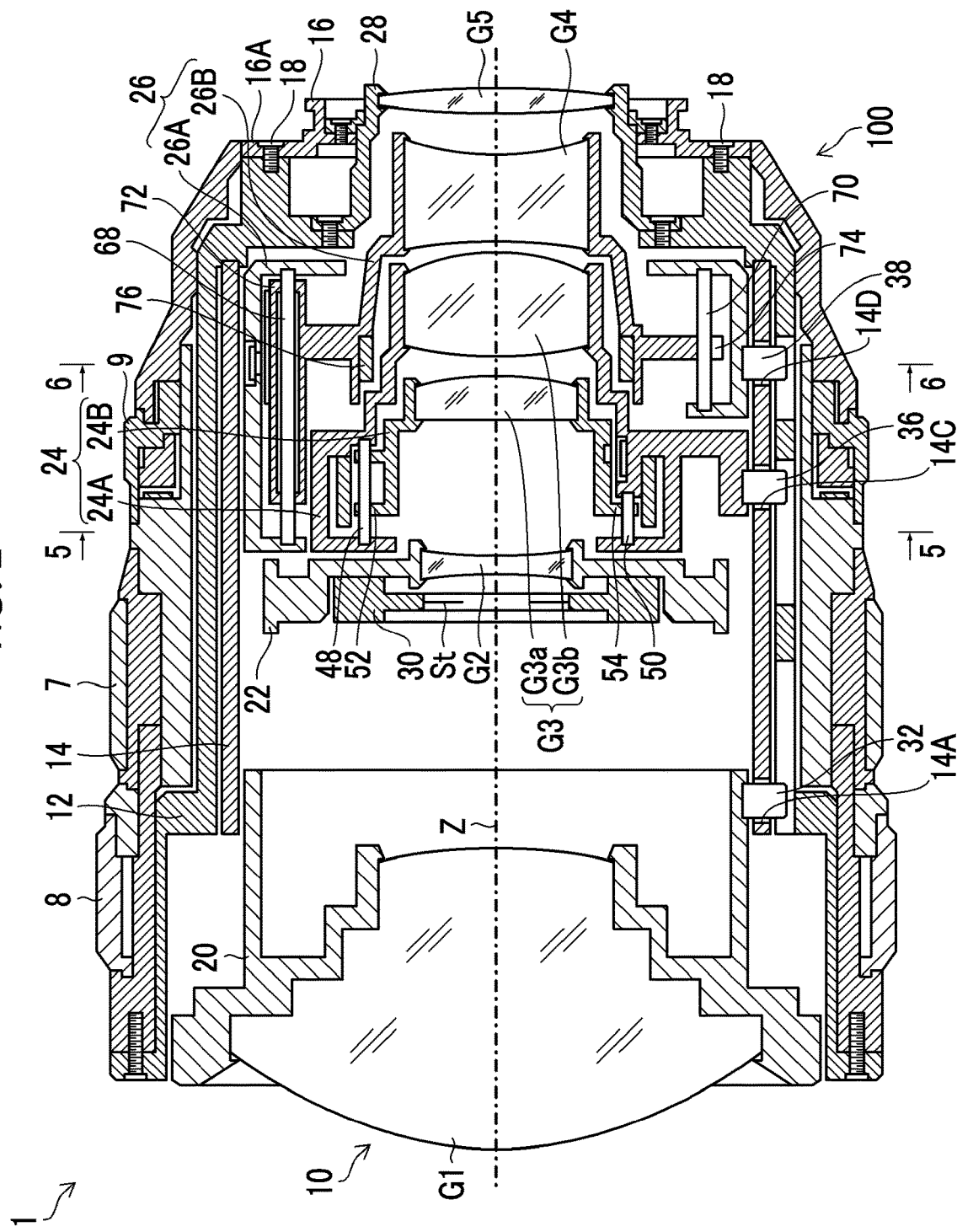
FIG. 2 is a plan cross-sectional view showing the schematic configuration of the inside of the lens barrel at a wide-angle end.

Here, a case where the lens barrel according to this embodiment is applied to an interchangeable lens of a lens-interchangeable camera will be described by way of example. FIG. 1 is a side cross-sectional view showing the schematic configuration of the inside of the lens barrel at a wide-angle end, and FIG. 2 is a plan cross-sectional view showing the schematic configuration of the inside of the lens barrel at a wide-angle end.

The interchangeable lens 1 of this embodiment is a so-called zoom lens, and mainly includes a lens barrel body 10 with which lenses are assembled and an exterior body 100 that covers the outer periphery of the lens barrel body 10. A focal length is continuously changed by an operation for rotating a zoom ring 7 that is provided on the outer peripheral portion of the exterior body 100. Since the zoom ring 7 is connected to a cam barrel 14 by a connecting member (not shown), a focal length is changed in a case where the cam barrel 14 is rotated by an operation for rotating the zoom ring 7.

Further, the interchangeable lens 1 of this embodiment has a manual focus adjustment function, and is adapted so that a focus can be manually adjusted by an operation for rotating a focus ring 8 provided on the outer peripheral portion of the interchangeable lens 1. Furthermore, the interchangeable lens 1 of this embodiment has a manual stop setting function, and is adapted so that a stop can be manually set by an operation for rotating the stop ring 9 provided on the outer peripheral portion of the interchangeable lens 1. The zoom ring 7, the focus ring 8, and the stop ring 9 are examples of a plurality of operation rings.

<<Lens Barrel Body>>

As shown in FIGS. 1 and 2, the lens barrel body 10 includes a stationary barrel 12 and a cam barrel 14. The cam barrel 14 is fitted to the inner peripheral portion of the stationary barrel 12 and is held so as to be rotatable in a circumferential direction on the inner peripheral portion of the stationary barrel 12. The stationary barrel 12 is an example of a stationary frame.

The stationary barrel 12 includes a mount 16 provided at a proximal end portion thereof (an end portion thereof positioned on an image plane side). The mount 16 is formed of a so-called bayonet mount. The mount 16 is mounted on the proximal end portion of the stationary barrel 12 by a plurality of mount fixing screws 18.

As shown in FIGS. 1 and 2, the stationary barrel 12 is adapted so that the proximal end portion has the smallest outer diameter. The outer diameter of the mount 16 is equal to or smaller than the outer diameter of the proximal end portion of the stationary barrel 12. More specifically, the outer diameter of a flange portion 16A having the largest outer diameter is equal to or smaller than the outer diameter of the proximal end portion of the stationary barrel 12. In this embodiment, the outer diameter of the flange portion 16A is equal to the outer diameter of the proximal end portion of the stationary barrel 12.

<Lens Configuration>

A plurality of lenses are arranged in the stationary barrel 12. Specifically, a first lens group G1, a second lens group G2, a third lens group G3, a fourth lens group G4, and a fifth lens group G5 are arranged in this order from an object side along an optical axis Z. Each lens group is composed of at least one lens. The first lens group G1, the second lens group G2, the third lens group G3, the fourth lens group G4, and the fifth lens group G5 are an example of optical members, the third lens group G3 is an example of a first optical member, and the fourth lens group G4 is an example of a second optical member.

Further, a stop St is disposed in the stationary barrel 12. The stop St is disposed between the first lens group G1 and the second lens group G2.

Figure 3:
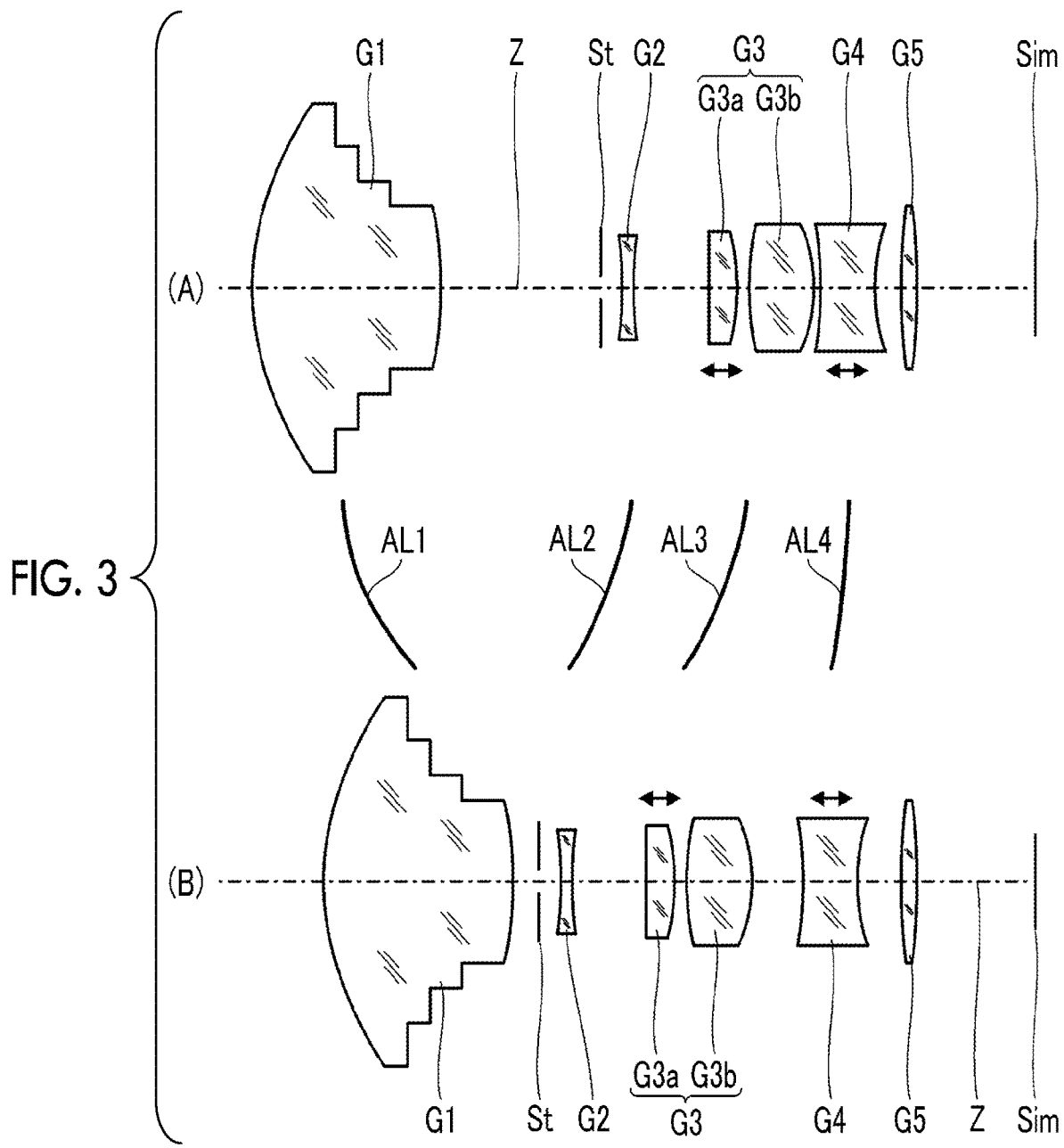
FIG. 3 is a diagram showing the movement state of each lens group in a case where a zoom operation is performed.
Figure 4:
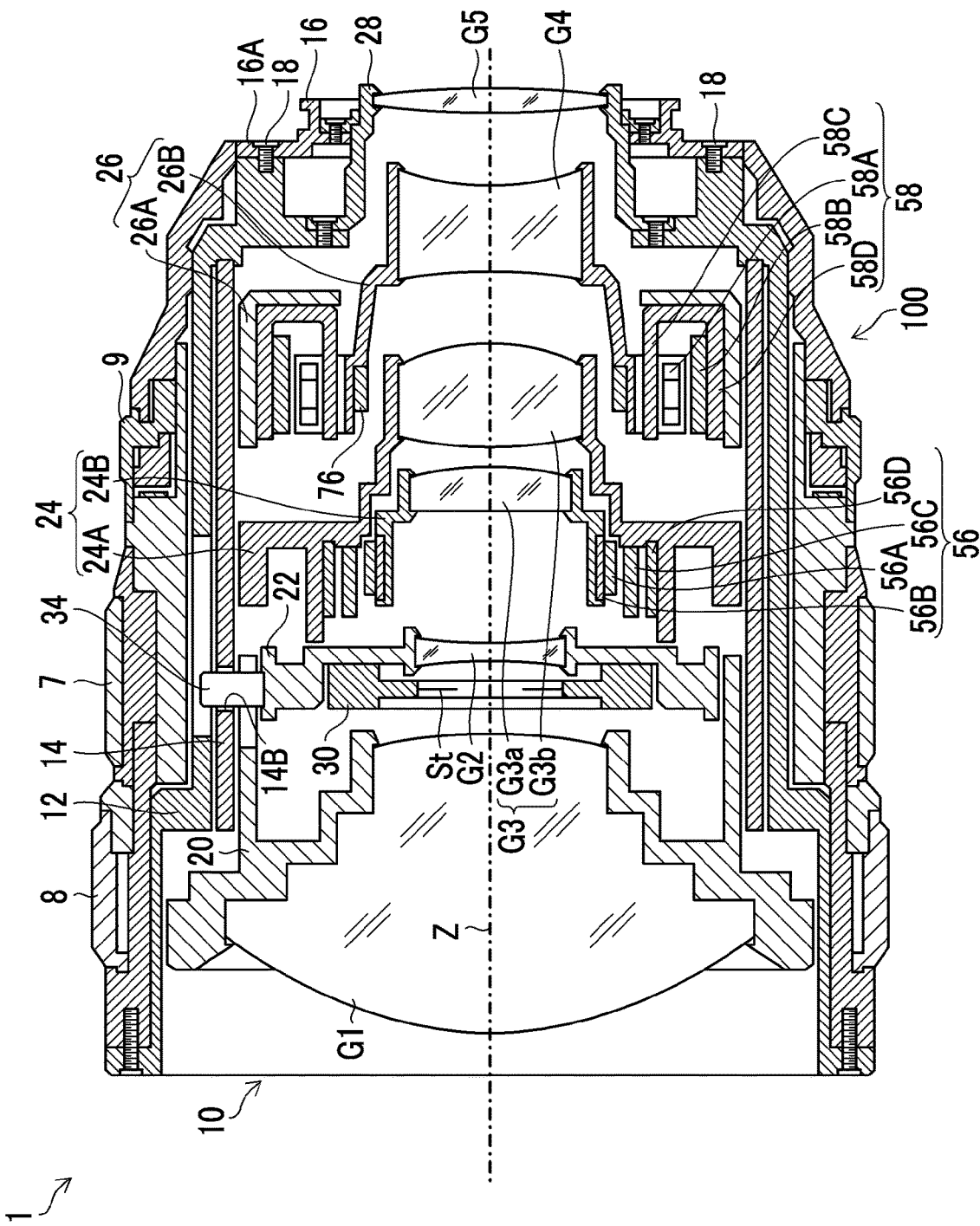
FIG. 4 is a diagram showing the schematic configuration of the inside of the lens barrel at a telephoto end.

FIG. 3 is a diagram showing the movement state of each lens group in a case where a zoom operation is performed. FIG. 4 is a side cross-sectional view showing the schematic configuration of the inside of the lens barrel at a telephoto end. In FIG. 3, part (A) shows the arrangement of lenses at a wide-angle end, and part (B) shows the arrangement of lenses at a telephoto end.

As shown in FIG. 3, the first to fourth lens groups G1 to G4 are lens groups that are moved relative to an image plane Sim by a zoom operation. The fifth lens group G5 is a lens group that is fixed with respect to the image plane Sim by a zoom operation. The first lens group G1 is moved along a movement locus AL1 by a zoom operation, and the second lens group G2 is moved along a movement locus AL2 by a zoom operation. Further, the third lens group G3 is moved along a movement locus AL3 by a zoom operation, and the fourth lens group G4 is moved along a movement locus AL4 by a zoom operation. The stop St moves integrally with the second lens group G2.

As shown in FIG. 3, the third lens group G3 is composed of a third front lens group G3a and a third rear lens group G3b. The third front lens group G3a is a lens group for correcting field curvature. The third front lens group G3a is a lens group that is movable independently of the other lens groups. In a case where field curvature is to be corrected, the third front lens group G3a is moved along the optical axis Z.

Further, the fourth lens group G4 is a lens group for adjusting a focus. The fourth lens group G4 is a lens group that is movable independently of the other lens groups. In a case where a focus is to be adjusted, the fourth lens group G4 is moved along the optical axis Z.

<Holding Structure for Each Lens Group>

[First Lens Group]

As shown in FIGS. 1 and 2, the first lens group G1 is held by a first lens group-holding frame 20 and is disposed in the stationary barrel 12.

The outer peripheral portion of the first lens group-holding frame 20 is provided with three first lens group-driving cam pins 32. The three first lens group-driving cam pins 32 are arranged at regular intervals in the circumferential direction. The first lens group-driving cam pins 32 are fitted to first lens group-driving cam grooves 14A provided at the cam barrel 14 and first lens group-driving straight movement grooves provided at the stationary barrel 12, respectively.

The first lens group G1 is held in the stationary barrel 12 due to the above-mentioned configuration. Further, in a case where the cam barrel 14 is rotated, the first lens group G1 is moved along the optical axis Z in the stationary barrel 12.

[Second Lens Group]

As shown in FIGS. 1 and 2, the second lens group G2 is held by a second lens group-holding frame 22 and is disposed in the stationary barrel 12.

The outer peripheral portion of the second lens group-holding frame 22 is provided with three second lens group-driving cam pins 34. The three second lens group-driving cam pins 34 are arranged at regular intervals in the circumferential direction. The second lens group-driving cam pins 34 are fitted to second lens group-driving cam grooves 14B provided at the cam barrel 14 and second lens group-driving straight movement grooves provided at the stationary barrel 12, respectively.

The second lens group G2 is held in the stationary barrel 12 due to the above-mentioned configuration. Further, in a case where the cam barrel 14 is rotated, the second lens group G2 is moved along the optical axis Z in the stationary barrel 12.

As shown in FIGS. 1 and 2, a stop unit 30 forming the stop St is assembled with the second lens group-holding frame 22. Accordingly, the stop St is disposed in the stationary barrel 12 and is moved together with the second lens group G2.

[Third Lens Group]

As shown in FIGS. 1 and 2, the third lens group G3 is held by a third lens group-holding frame 24 and is disposed in the stationary barrel 12.

The third lens group-holding frame 24 includes a third rear lens group-holding frame 24A and a third front lens group-holding frame 24B that is held by the inner peripheral portion of the third rear lens group-holding frame 24A. The third front lens group-holding frame 24B is held so as to be movable along the optical axis Z on the inner peripheral portion of the third rear lens group-holding frame 24A. The third front lens group G3a is held by the third front lens group-holding frame 24B. The third rear lens group G3b is held by the third rear lens group-holding frame 24A.

Figure 5:
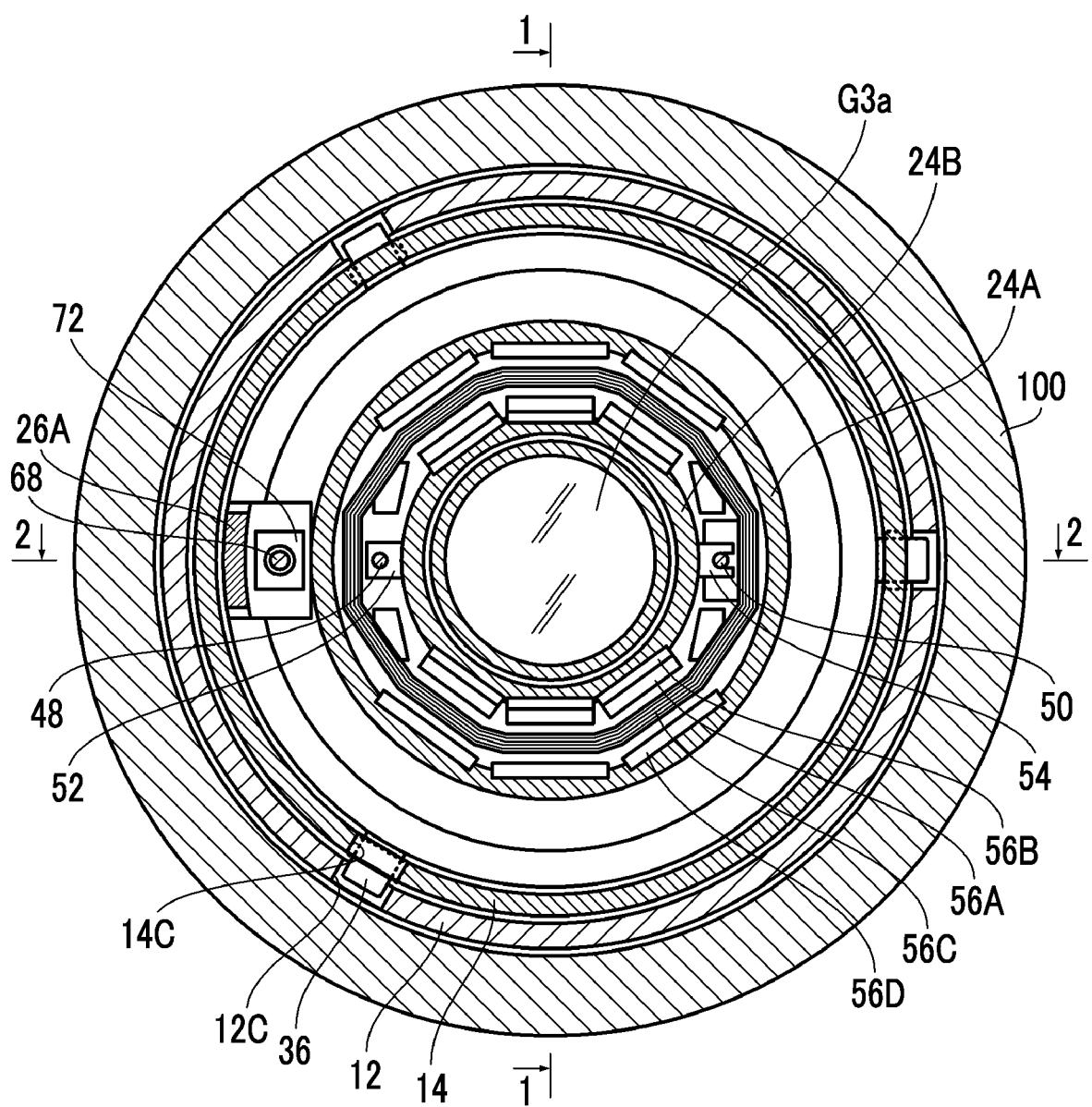
FIG. 5 is a cross-sectional view taken along line 5-5 of FIGS. 1 and 2.

FIG. 5 is a cross-sectional view taken along line 5-5 of FIGS. 1 and 2.

As shown in FIG. 5, the outer peripheral portion of the third rear lens group-holding frame 24A is provided with three third lens group-driving cam pins 36. The three third lens group-driving cam pins 36 are arranged at regular intervals in the circumferential direction. The third lens group-driving cam pins 36 are fitted to third lens group-driving cam grooves 14C provided at the cam barrel 14 and third lens group-driving straight movement grooves 12C provided at the stationary barrel 12, respectively.

A first main shaft 48 and a first sub-shaft 50 are provided at the inner peripheral portion of the third rear lens group-holding frame 24A. The first main shaft 48 and the first sub-shaft 50 are disposed at positions facing each other with the optical axis Z interposed therebetween (disposed at an interval of 180° in the circumferential direction), and are disposed along the optical axis Z.

The third front lens group-holding frame 24B is slidably supported by the first main shaft 48 and the first sub-shaft 50, which are provided at the third rear lens group-holding frame 24A, through a first main guide portion 52 and a first sub-guide portion 54. Accordingly, the third front lens group-holding frame 24B is supported so as to be movable along the optical axis Z on the inner peripheral portion of the third rear lens group-holding frame 24A. The third rear lens group-holding frame 24A is an example of a first frame body, and the third front lens group-holding frame 24B is an example of a first movable frame.

The third front lens group-holding frame 24B is driven by a first motor 56, and is moved along the optical axis Z on the inner peripheral portion of the third rear lens group-holding frame 24A. The first motor 56 is formed of a moving magnet type voice coil motor. The third front lens group-holding frame 24B is provided with a plurality of first magnets 56A and a plurality of inner yokes 56B of the voice coil motor that forms the first motor 56. Further, the third rear lens group-holding frame 24A is provided with a first coil 56C and a plurality of outer yokes 56D of the voice coil motor that forms the first motor 56. The first motor 56 is an example of a first drive unit.

The third lens group G3 is held in the stationary barrel 12 due to the above-mentioned configuration. Further, in a case where the cam barrel 14 is rotated, the third lens group G3 is moved along the optical axis Z in the stationary barrel 12 (the third front lens group G3a and the third rear lens group G3b are integrated with each other and are moved along the optical axis Z in the stationary barrel 12). Furthermore, in a case where the first motor 56 is driven, the third front lens group G3a is moved alone along the optical axis Z (the third front lens group G3a is moved independently along the optical axis Z). Since the third front lens group G3a is moved independently, field curvature is corrected.

[Fourth Lens Group]

As shown in FIGS. 1 and 2, the fourth lens group G4 is held by a fourth lens group-holding frame 26 and is disposed in the stationary barrel 12. The fourth lens group-holding frame 26 includes a fourth lens group base-holding frame 26A and a fourth lens group-movable holding frame 26B that is held by the inner peripheral portion of the fourth lens group base-holding frame 26A. The fourth lens group-movable holding frame 26B is supported so as to be movable along the optical axis Z on the inner peripheral portion of the fourth lens group base-holding frame 26A. The fourth lens group G4 is held by the inner peripheral portion of the fourth lens group-movable holding frame 26B.

Figure 6:
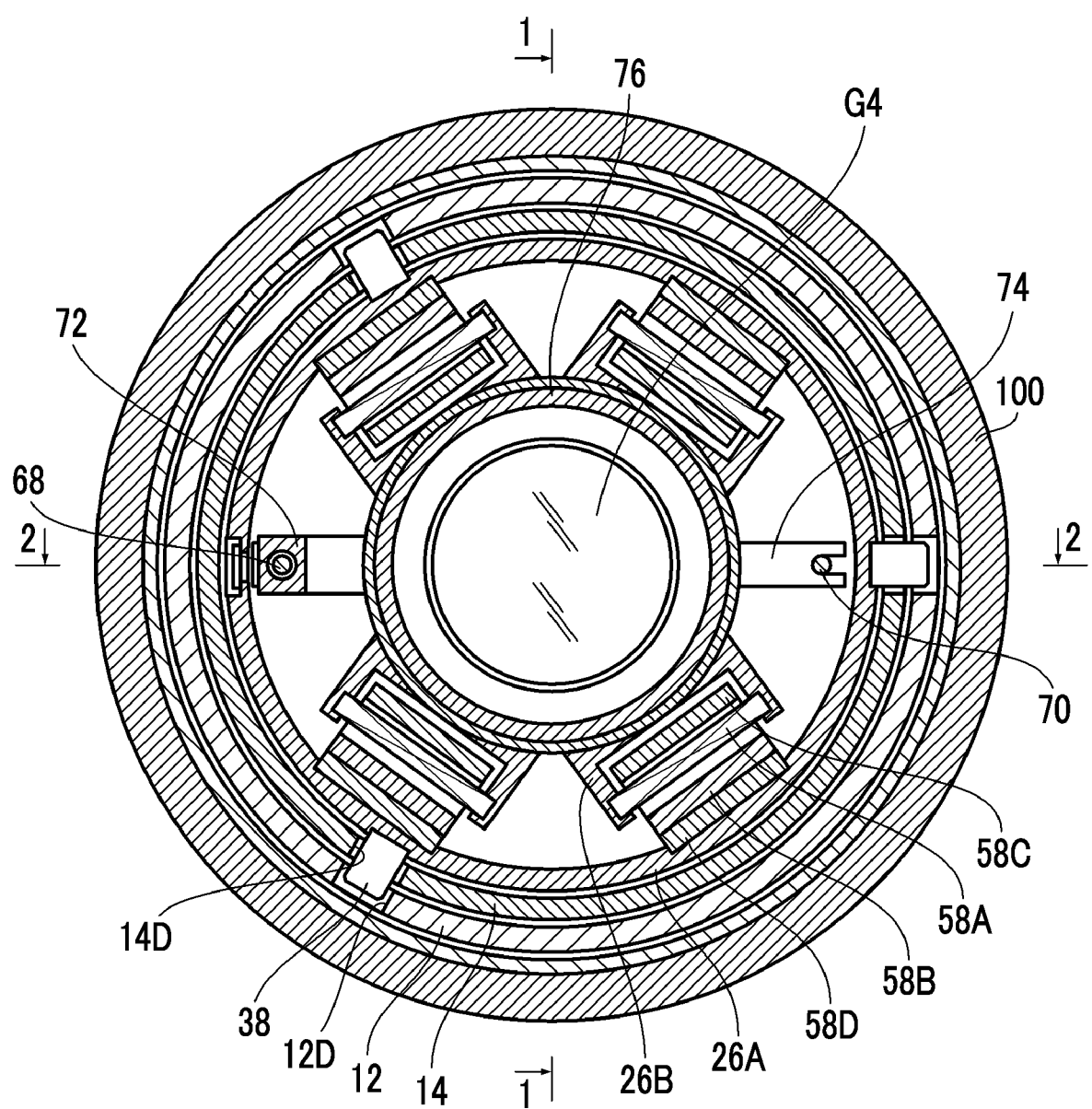
FIG. 6 is a cross-sectional view taken along line 6-6 of FIGS. 1 and 2.

FIG. 6 is a cross-sectional view taken along line 6-6 of FIGS. 1 and 2.

As shown in FIG. 6, the outer peripheral portion of the fourth lens group base-holding frame 26A is provided with three fourth lens group-driving cam pins 38. The three fourth lens group-driving cam pins 38 are arranged at regular intervals in the circumferential direction. The fourth lens group-driving cam pins 38 are fitted to fourth lens group-driving cam grooves 14D provided at the cam barrel 14 and fourth lens group-driving straight movement grooves 12D provided at the stationary barrel 12, respectively.

Further, the fourth lens group base-holding frame 26A is provided with a second main shaft 68 and a second sub-shaft 70. The second main shaft 68 and the second sub-shaft 70 are disposed at positions facing each other with the optical axis Z interposed therebetween (disposed at an interval of 180° in the circumferential direction), and are disposed along the optical axis Z.

The fourth lens group-movable holding frame 26B is slidably supported by the second main shaft 68 and the second sub-shaft 70, which are provided at the fourth lens group base-holding frame 26A, through a second main guide portion 72 and a second sub-guide portion 74. Accordingly, the fourth lens group-movable holding frame 26B is supported so as to be movable along the optical axis Z on the inner peripheral portion of the fourth lens group base-holding frame 26A. The fourth lens group base-holding frame 26A is an example of a second frame body, and the fourth lens group-movable holding frame 26B is an example of a second movable frame.

The fourth lens group-movable holding frame 26B is driven by a second motor 58 that is a focus motor, and is moved along the optical axis Z on the inner peripheral portion of the fourth lens group base-holding frame 26A. The second motor 58 is formed of a moving coil type voice coil motor. The fourth lens group-movable holding frame 26B is provided with a plurality of second coils 58A of the voice coil motor that forms the second motor 58. Further, the fourth lens group base-holding frame 26A is provided with a plurality of second magnets 58B, a plurality of inner yokes 58C, and a plurality of outer yokes 58D of the voice coil motor that forms the second motor 58. The second motor 58 is an example of a second drive unit.

The fourth lens group G4 is held in the stationary barrel 12 due to the above-mentioned configuration. Further, in a case where the cam barrel 14 is rotated, the fourth lens group G4 is moved along the optical axis Z in the stationary barrel 12. Furthermore, in a case where the second motor 58 is driven, the fourth lens group G4 is moved independently along the optical axis Z. Since the fourth lens group G4 is moved independently, a focus is adjusted.

The fourth lens group-movable holding frame 26B includes a balance weight 76 provided at a position opposite to the fourth lens group G4 in the direction of the optical axis Z. The positions of the centers of gravity of the fourth lens group-movable holding frame 26B and the fourth lens group G4 can be moved to a distal end side (object side) by the balance weight 76. The ring-shaped balance weight 76 is fitted to the object side of the barrel-shaped fourth lens group-movable holding frame 26B, so that the balance weight 76 can be provided. Since the position of the center of gravity of the fourth lens group-movable holding frame 26B is moved to the distal end side, the fourth lens group-movable holding frame 26B can be supported by the second main guide portion 72 and the second sub-guide portion 74. Accordingly, the fourth lens group-movable holding frame 26B can be smoothly moved.

[Fifth Lens Group]

As shown in FIGS. 1 and 2, the fifth lens group G5 is held by a fifth lens group-holding frame 28 and is disposed in the stationary barrel 12. The fifth lens group-holding frame 28 is mounted on the stationary barrel 12 by a plurality of fixing screws for the fifth lens group.

<Operation of Each Lens Group>

The lens barrel body 10 is adapted as described above.

In a case where the cam barrel 14 is rotated in the lens barrel body 10, the first lens group G1, the second lens group G2, the third lens group G3, and the fourth lens group G4 are moved along the optical axis Z. Accordingly, zooming is performed.

Further, in a case where the first motor 56 is driven in the lens barrel body 10, the third front lens group G3a is moved independently along the optical axis Z. Since the third front lens group G3a is moved independently, the field curvature of the interchangeable lens 1 is corrected.

Furthermore, in a case where the second motor 58 is driven, the fourth lens group G4 is moved independently along the optical axis Z. Since the fourth lens group G4 is moved independently, the focus of the interchangeable lens 1 is corrected. The fourth lens group-movable holding frame 26B is a barrel body that holds the fourth lens group G4 on one end side thereof (image plane side) and has a cavity on the other end side thereof (object side). A part of the third rear lens group-holding frame 24A and a part of the third front lens group-holding frame 24B, which hold the third lens group G3, is adapted to be capable of entering the cavity at a wide-angle end.

Further, in a case where an optical axis adjustment pin (not shown) is rotated, the third lens group G3 is moved in a plane orthogonal to the optical axis in the lens barrel body 10. Accordingly, the optical axis Z is adjusted.

[Fixing of Third Front Lens Group-Holding Frame]

As shown in FIGS. 1 and 4, the third lens group G3 and the fourth lens group G4 disposed in the interchangeable lens 1 are close to each other at a wide-angle end and are farthest from each other at a telephoto end. Further, the third front lens group-holding frame 24B is driven by the voice coil motor forming the first motor 56. Accordingly, in a case where the application of current to the first coil 56C is stopped, the third front lens group-holding frame 24B can be freely moved in the range of the first main shaft 48 and the first sub-shaft 50.

In this embodiment, magnetic bodies provided in the second motor 58 for driving the fourth lens group G4 is used to fix the third front lens group-holding frame 24B in a state where the application of current to the first coil 56C is stopped.

Figure 7:
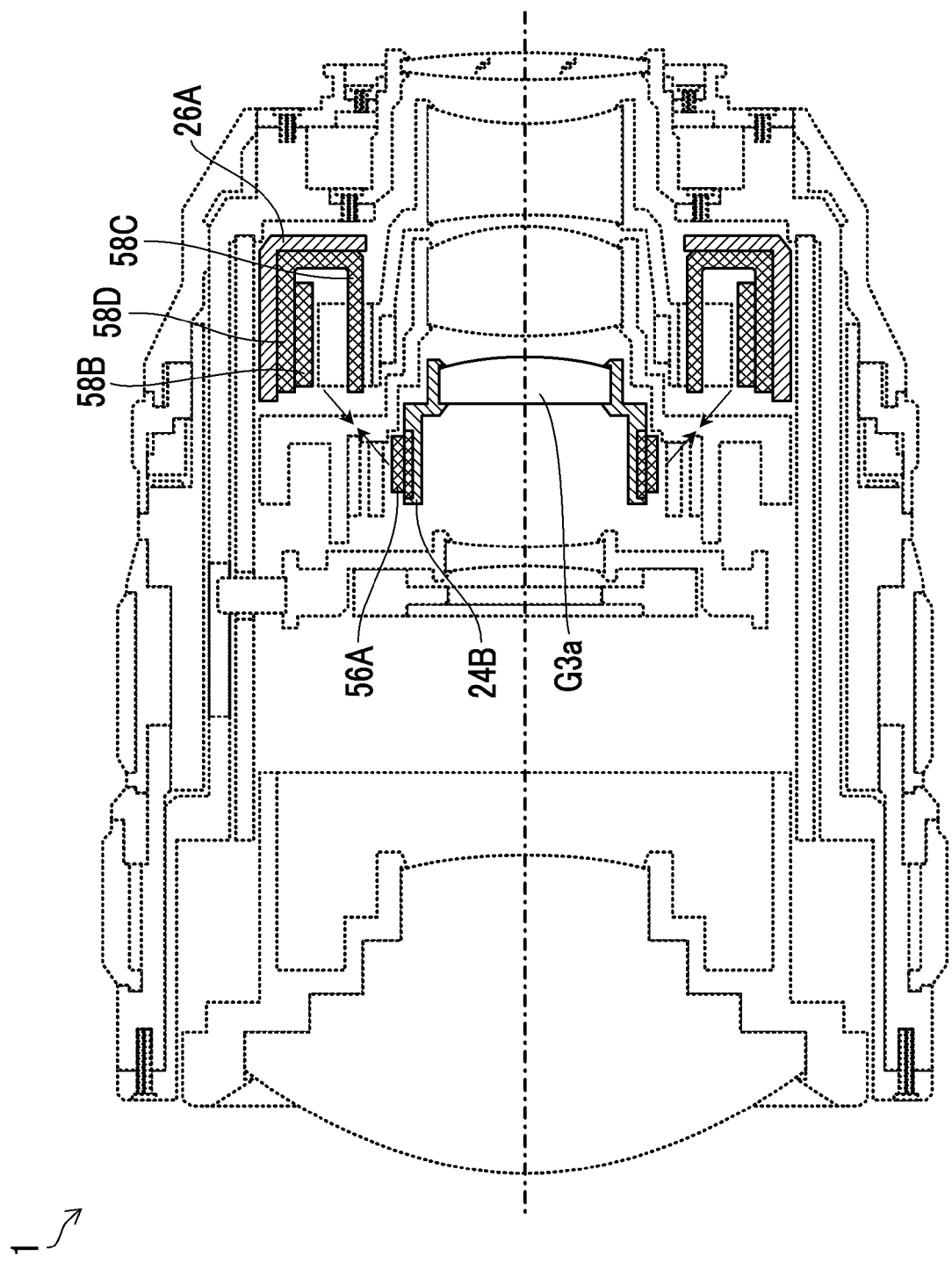
FIG. 7 is a diagram illustrating a state where a third front lens group-holding frame is fixed by a magnetic force.

FIG. 7 is a diagram illustrating a state where the third front lens group-holding frame is fixed at a wide-angle end.

The third front lens group-holding frame 24B is attracted and fixed by a magnetic force between the first magnets 56A of the first motor 56 and the inner and outer yokes 58C and 58D that are the magnetic bodies provided in the second motor 58. The first magnets 56A are provided on the third front lens group-holding frame 24B. The inner and outer yokes 58C and 58D are provided on the fourth lens group base-holding frame 26A and the fourth lens group base-holding frame 26A is held by the cam barrel 14. Accordingly, the third front lens group-holding frame 24B is fixed to the fourth lens group base-holding frame 26A and the cam barrel 14.

As described above, the third lens group G3 and the fourth lens group G4 are close to each other at a wide-angle end. That is, as shown in FIG. 7, the first magnets 56A provided on the third front lens group-holding frame 24B and the inner and outer yokes 58C and 58D of the second motor 58 are arranged close to each other and are arranged at a moving end where the third front lens group-holding frame 24B is not moved to the image plane side, at a wide-angle end. Accordingly, before the application of current to the first coil 56C is stopped, the respective lens groups are moved so that the arrangement of the respective lens groups is changed to the arrangement of the lens groups at a wide-angle end as shown in FIG. 1. After that, even though the application of current to the first coil 56C is stopped, the third front lens group-holding frame 24B cannot be moved to the image plane side of the interchangeable lens 1. Further, since the third front lens group-holding frame 24B is attracted by a magnetic force between the first magnets 56A and the inner and outer yokes 58C and 58D as shown by arrows in FIG. 7, the third front lens group-holding frame 24B cannot be moved to even the object side of the interchangeable lens 1. Accordingly, the third front lens group-holding frame 24B can be fixed in the interchangeable lens 1.

Furthermore, it is preferable that the plurality of first magnets 56A are arranged symmetrically with respect to the center of the third front lens group-holding frame 24B as shown in FIG. 5. Since the third front lens group-holding frame 24B is formed of a barrel body, any one of the first magnets 56A or the inner and outer yokes 58C and 58D can be made to be reliably close to each other in a case where the plurality of first magnets 56A are arranged symmetrically. As a result, third front lens group-holding frame 24B can be fixed by a magnetic force.

Further, in a case where a magnetic body is used as the balance weight 76, the balance weight 76 of the fourth lens group-movable holding frame 26B and the first magnets 56A of the third front lens group-holding frame 24B can be made to be attracted to each other by a magnetic force. Accordingly, since the fourth lens group-movable holding frame 26B can be fixed to the inner and outer yokes 58C and 58D fixed to the third front lens group-holding frame 24B, the movement of the fourth lens group-movable holding frame 26B can be prevented. Iron, cobalt, nickel, or an alloy thereof can be used for the magnetic body that is used as the balance weight 76.

Modification Example

<Modification Example of Second Lens Group>

Figure 8:
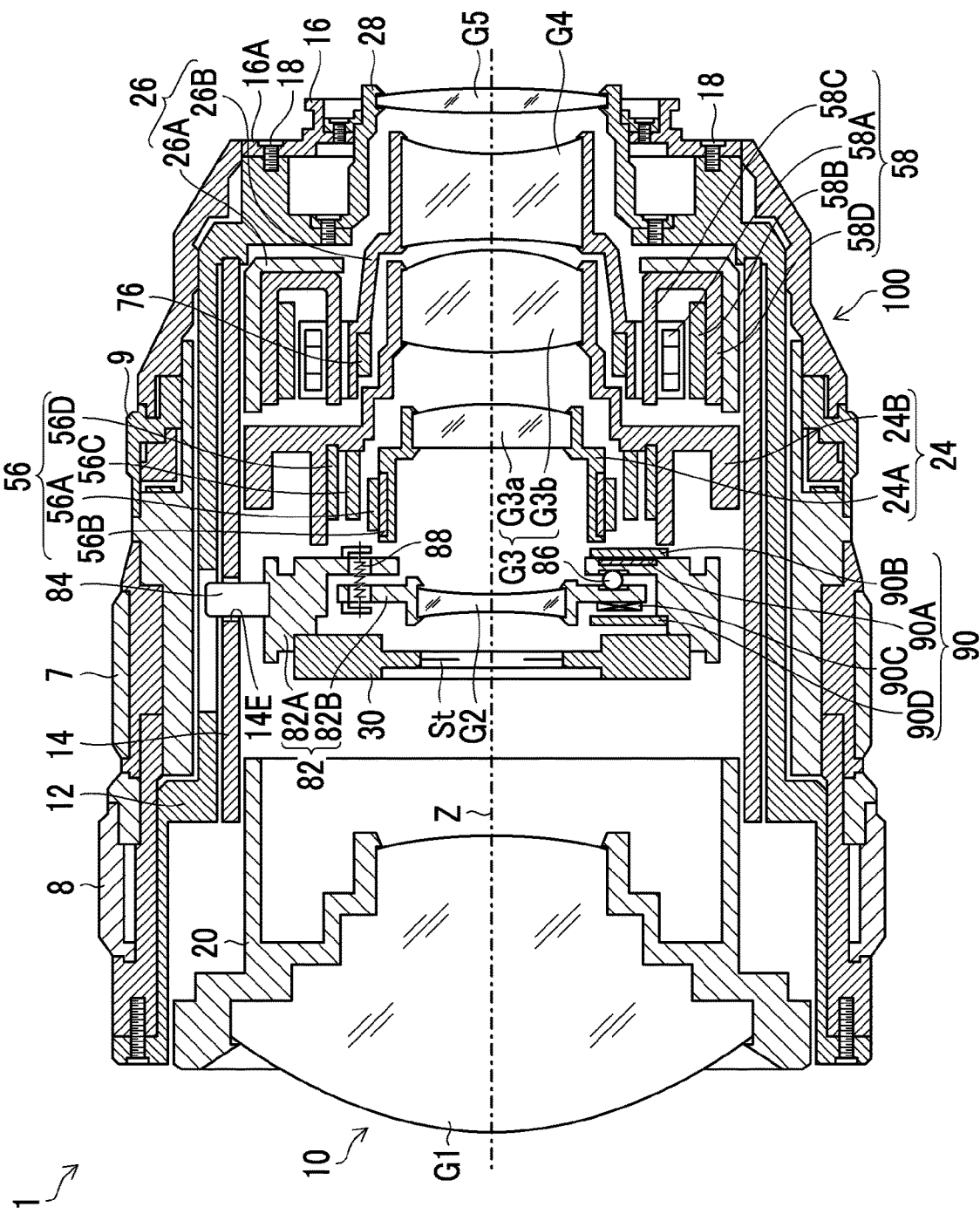
FIG. 8 is a side cross-sectional view showing the schematic configuration of the inside of a lens barrel of which a second lens group is a camera shake-correcting lens.

FIG. 8 is a side cross-sectional view showing the schematic configuration of the inside of the lens barrel according to the embodiment of which the second lens group G2 of the embodiment is formed of a camera shake-correcting lens.

As shown in FIG. 8, the second lens group (camera shake-correcting lens) G2 is held by a camera shake-correcting lens-holding frame 82 and is disposed in the stationary barrel 12.

The camera shake-correcting lens-holding frame 82 includes a camera shake-correcting lens base-holding frame 82A and a camera shake-correcting lens-movable holding frame 82B that is held by the inner peripheral portion of the camera shake-correcting lens base-holding frame 82A. The second lens group (camera shake-correcting lens) G2 is held by the inner peripheral portion of the camera shake-correcting lens-movable holding frame 82B. In this embodiment, the camera shake-correcting lens base-holding frame 82A is an example of a second frame body and the camera shake-correcting lens-movable holding frame 82B is an example of a second movable frame. Further, the second lens group (camera shake-correcting lens) G2 is an example of a second optical member.

The outer peripheral portion of the camera shake-correcting lens base-holding frame 82A is provided with three camera shake-correcting lens-driving cam pins 84. The three camera shake-correcting lens-driving cam pins 84 are arranged at regular intervals in the circumferential direction. The camera shake-correcting lens-driving cam pins 84 are fitted to camera shake-correcting lens-driving cam grooves 14E provided at the cam barrel 14 and camera shake-correcting lens-driving straight movement grooves provided at the stationary barrel 12, respectively. A stop unit 30 forming the stop St is assembled with the camera shake-correcting lens-holding frame 82.

The camera shake-correcting lens base-holding frame 82A and the camera shake-correcting lens-movable holding frame 82B are supported by three steel balls 86 and four springs 88 that are arranged on the inner peripheral portion of the camera shake-correcting lens base-holding frame 82A at regular intervals in the circumferential direction. Further, the camera shake-correcting lens-movable holding frame 82B is driven by an X-axis motor (not shown) and a Y-axis motor 90, and can be moved in directions orthogonal to the optical axis Z. The spring 88 is a biasing member for biasing the camera shake-correcting lens-movable holding frame 82B to the camera shake-correcting lens base-holding frame 82A with the steel balls 86 interposed between the camera shake-correcting lens-movable holding frame 82B and the camera shake-correcting lens base-holding frame 82A. The Y-axis motor 90 is formed of a moving coil type voice coil motor. The camera shake-correcting lens-movable holding frame 82B is provided with a coil 90C of the voice coil motor forming the Y-axis motor 90. Furthermore, the camera shake-correcting lens base-holding frame 82A is provided with magnets 90A and yokes 90B and 90D of the voice coil motor forming the Y-axis motor 90. The X-axis motor (not shown) also has the same configuration as the Y-axis motor. In this embodiment, the X-axis motor and the Y-axis motor 90 are an example of a second drive unit.

The second lens group (camera shake-correcting lens) G2 is held in the stationary barrel 12 due to the above-mentioned configuration. Further, in a case where the X-axis motor and the Y-axis motor 90 are driven, the second lens group (camera shake-correcting lens) G2 is moved in directions perpendicular to the optical axis Z.

Figure 9:
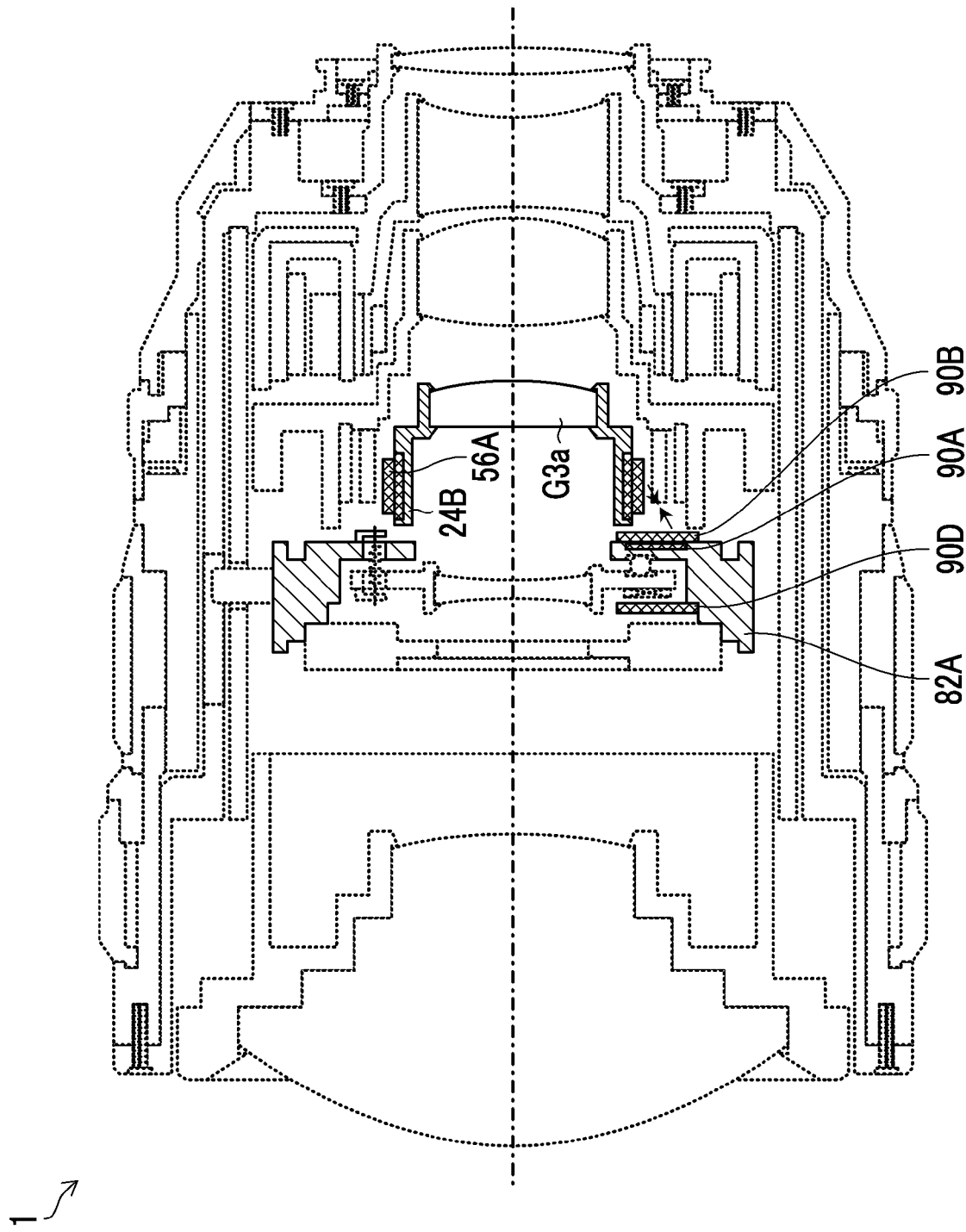
FIG. 9 is a diagram showing a modification example of the state where the third front lens group-holding frame is fixed by a magnetic force.

FIG. 9 is a diagram showing a state where the third front lens group-holding frame is fixed to the camera shake-correcting lens base-holding frame.

In a case where a camera shake-correcting lens is used as the second lens group G2, the X-axis motor and the Y-axis motor 90 for moving the camera shake-correcting lens are provided as described above. In this embodiment, the third front lens group-holding frame 24B is fixed using the magnetic bodies that are provided in the X-axis motor and the Y-axis motor 90.

In the embodiment shown in FIG. 9, the third front lens group-holding frame 24B is attracted and fixed by a magnetic force between the first magnets 56A of the first motor 56 and the yokes 90B that are the magnetic bodies provided in the Y-axis motor 90. The yokes 90B are provided on the camera shake-correcting lens base-holding frame 82A, and the camera shake-correcting lens base-holding frame 82A is held by the cam barrel 14. Accordingly, the third front lens group-holding frame 24B is fixed to the camera shake-correcting lens base-holding frame 82A and the cam barrel 14.

In a case where the third front lens group-holding frame 24B is to be fixed to the yokes 90B of the camera shake-correcting lens base-holding frame 82A, the application of current to the first coil 56C is stopped in a state where the third front lens group-holding frame 24B is disposed on the distal end side in the interchangeable lens 1, that is, the third front lens group-holding frame 24B is disposed at a moving end where the third front lens group-holding frame 24B is not moved to the distal end side before the application of current to the first coil 56C of the first motor 56 is stopped. Accordingly, since the third front lens group-holding frame 24B can be attracted by a magnetic force between the first magnets 56A of the first motor 56 and the yokes 90B of the camera shake-correcting lens base-holding frame 82A as shown by arrows in FIG. 9, the movement of the third front lens group-holding frame 24B can be prevented and fixed in the interchangeable lens 1.

[Electric Configuration of Interchangeable Lens]

Figure 10:
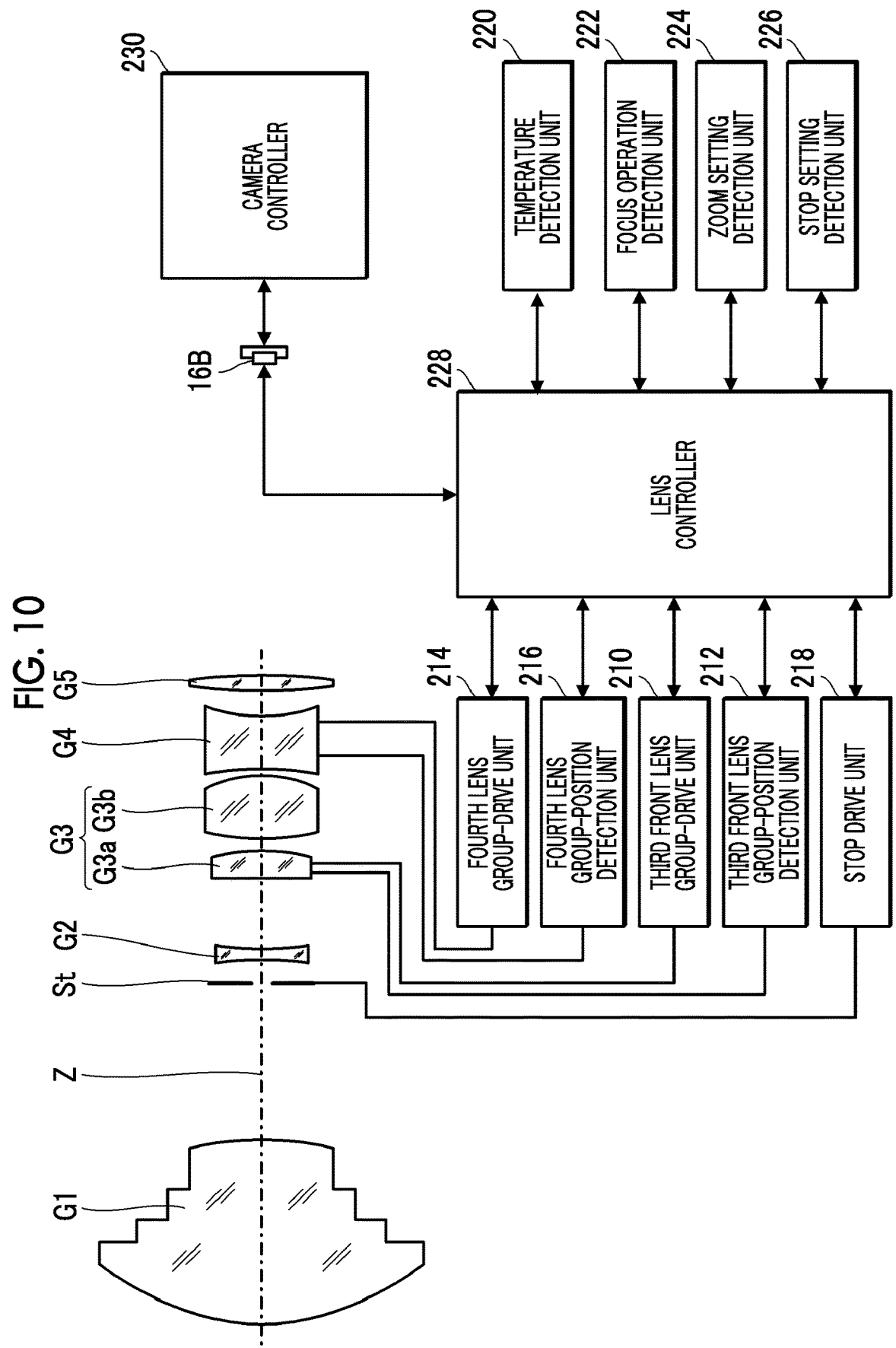
FIG. 10 is a block diagram showing the electric configuration of an interchangeable lens.

FIG. 10 is a block diagram showing the electric configuration of the interchangeable lens.

The interchangeable lens 1 comprises a third front lens group-drive unit 210 that drives the third front lens group G3a, a third front lens group-position detection unit 212 that detects the position of the third front lens group G3a, a fourth lens group-drive unit 214 that drives the fourth lens group G4, a fourth lens group-position detection unit 216 that detects the position of the fourth lens group G4, a stop drive unit 218 that drives the stop St, a temperature detection unit 220 that detects a temperature inside the interchangeable lens 1, a focus operation detection unit 222 that detects a focus operation, a zoom setting detection unit 224 that detects a zoom operation, a stop setting detection unit 226 that detects a stop operation, and a lens controller 228 that controls the action of the entire interchangeable lens 1 overall.

The third front lens group-drive unit 210 comprises the first motor 56 and a drive circuit for the first motor 56. The third front lens group-drive unit 210 drives the first motor 56 according to a command from the lens controller 228 and moves the third front lens group G3a along the optical axis Z.

The third front lens group-position detection unit 212 comprises a position detection sensor (not shown). For example, the position detection sensor is formed of a magnetic sensor, such as a hall element or a magneto resistive sensor. The third front lens group-position detection unit 212 detects the position of the third front lens group G3a by the position detection sensor and outputs a detection result thereof to the lens controller 228. The position of the third front lens group G3a is the position thereof relative to the third rear lens group G3b and is the position thereof within the third rear lens group-holding frame 24A.

The fourth lens group-drive unit 214 comprises the second motor 58 and a drive circuit for the second motor 58. The fourth lens group-drive unit 214 drives the second motor 58 according to a command from the lens controller 228 and moves the fourth lens group G4 along the optical axis Z.

The fourth lens group-position detection unit 216 comprises a position detection sensor (not shown). For example, the position detection sensor is formed of a magnetic sensor, such as a hall element or a magneto resistive sensor. The fourth lens group-position detection unit 216 detects the position of the fourth lens group G4 by the position detection sensor and outputs a detection result thereof to the lens controller 228. The position of the fourth lens group G4 is the position thereof within the fourth lens group-holding frame 26.

The stop drive unit 218 comprises a stop motor and a drive circuit for the stop motor. The stop motor (not shown) is included in the stop unit 30. The stop drive unit 218 drives the stop motor according to a command from the lens controller 228 and opens and closes the stop St.

The temperature detection unit 220 comprises a temperature sensor (not shown). The temperature sensor is included in, for example, the stop unit 30. The temperature detection unit 220 detects a temperature inside the interchangeable lens 1 by the temperature sensor, and outputs a detection result thereof to the lens controller 228.

The focus operation detection unit 222 detects the rotation angle of the focus ring 8 and outputs a detection result thereof to the lens controller 228. The lens controller 228 detects the amount of adjustment of a focus on the basis of the output from the focus operation detection unit 222.

The zoom setting detection unit 224 detects the set position of the zoom ring 7 and outputs a detection result thereof to the lens controller 228. The lens controller 228 detects the set value (focal length) of a zoom on the basis of the output from the zoom setting detection unit 224.

The stop setting detection unit 226 detects the set position of the stop ring 9 and outputs a detection result thereof to the lens controller 228. The lens controller 228 detects the set value (F number) of the stop on the basis of the output from the stop setting detection unit 226.

The lens controller 228 controls the actions of the respective parts on the basis of the operations of the focus ring 8, the zoom ring 7, and the stop ring 9. Specifically, in a case where a manual focus is set, the lens controller 228 drives the fourth lens group-drive unit 214 on the basis of the rotation angle of the focus ring 8 and causes the fourth lens group G4 to be moved. Further, the lens controller 228 drives the third front lens group-drive unit 210 and the fourth lens group-drive unit 214 on the basis of the setting of the zoom ring 7 and causes the third front lens group G3a and the fourth lens group G4 to be moved to predetermined positions. Furthermore, the lens controller 228 drives the stop drive unit 218 on the basis of the setting of the stop ring 9 and sets the stop St to a predetermined aperture value (F number).

Further, the lens controller 228 controls the action of each part according to a command from a camera on which the interchangeable lens 1 is mounted. For example, the lens controller 228 drives the fourth lens group-drive unit 214 on the basis of auto-focus information from the camera, and causes the fourth lens group G4 to be moved to a predetermined position. Furthermore, the lens controller 228 drives the stop drive unit 218 on the basis of stop setting information from the camera and sets the stop St to a predetermined aperture value.

The lens controller 228 communicates with a camera controller 230 of the camera and receives a drive command for each part from the camera controller 230. Further, the lens controller 228 transmits zoom setting information, stop setting information, focus position information, and the like to the camera controller 230. Communication between the lens controller 228 and the camera controller 230 is performed through a terminal 16B that is provided on the mount 16.

Furthermore, the lens controller 228 drives the third front lens group-drive unit 210 on the basis of the temperature detected by the temperature detection unit 220 and causes the third front lens group G3a to be moved to a predetermined position.

The lens controller 228 is formed of, for example, a computer that comprises a central processing unit (CPU), a read only memory (ROM), and a random access memory (RAM), and achieves various control functions and the like by executing predetermined programs.

[Configuration of Imaging Device]

Figure 11:
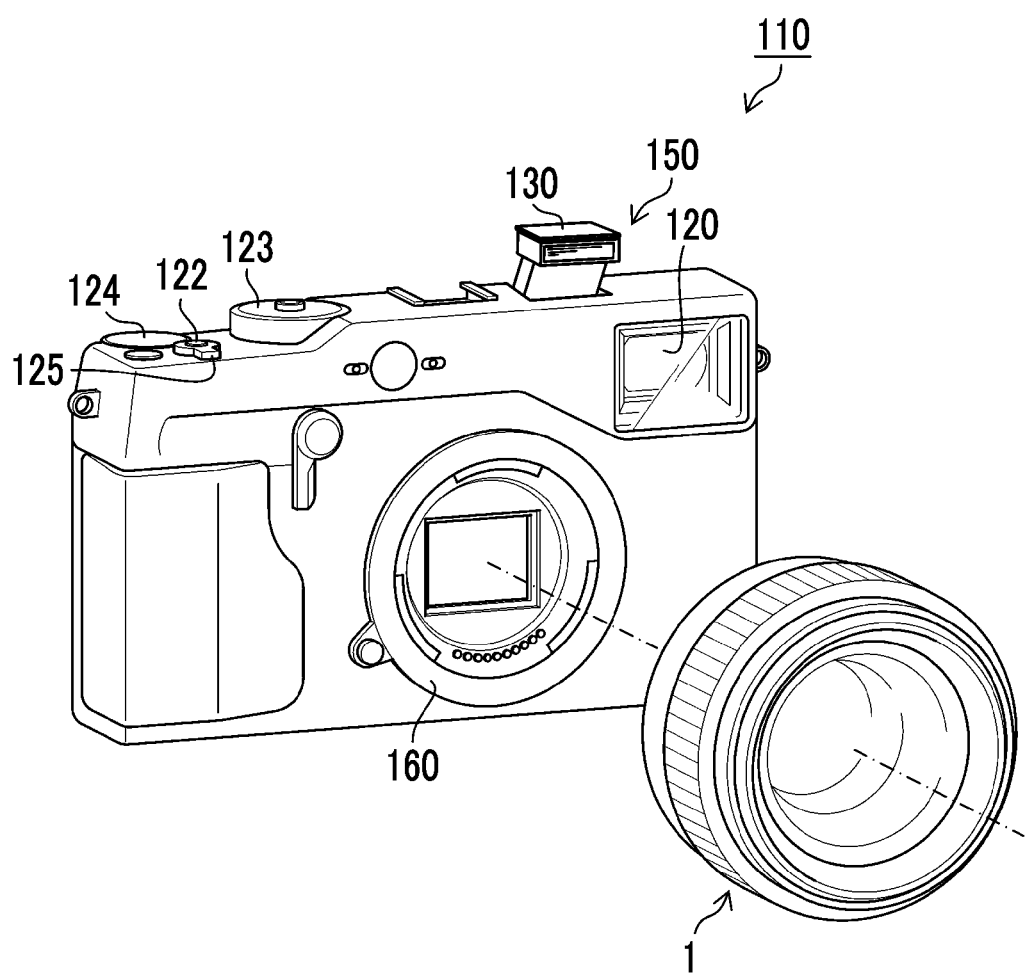
FIG. 11 is a perspective view of a camera system that is viewed obliquely from the front side.
Figure 12:
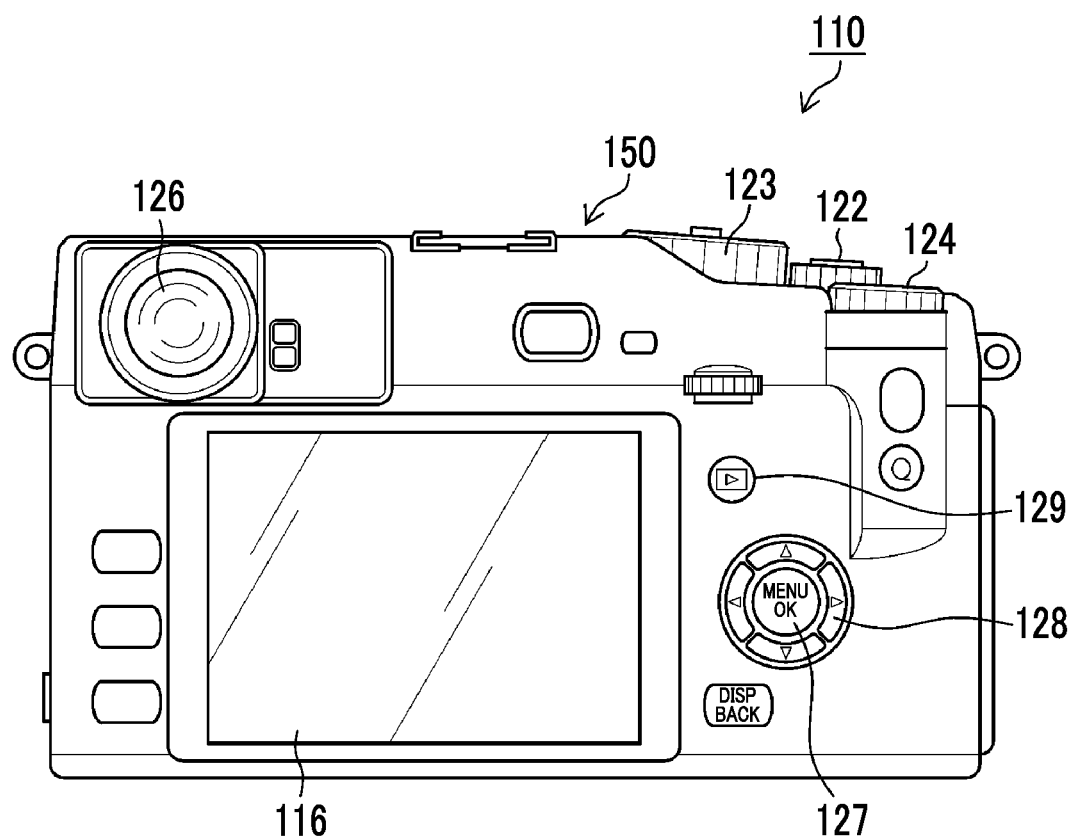
FIG. 12 is a back view of a camera body.

Next, an imaging device including the lens barrel according to this embodiment will be described. FIGS. 11 and 12 are external views showing one configuration example of a camera system, which uses the lens barrel according to this embodiment, as an example of the imaging device. FIG. 11 is a perspective view of the camera system that is viewed obliquely from the front side, and FIG. 12 is a back view of a camera body.

As shown in FIG. 11, the camera system 110 is a digital single-lens mirrorless camera or a digital single-lens reflex camera that includes the interchangeable lens 1 and a camera body 150 to and from which the interchangeable lens 1 is attachable and detachable. Further, the imaging device is not limited to the camera system shown in FIGS. 11 and 12, and it goes without saying that the imaging device may be a digital single-lens mirrorless camera or a digital single-lens reflex camera of which a lens and a camera body are integrated with each other.

A body mount 160 on which the interchangeable lens 1 is to be mounted, a finder window 120 of an optical finder, and the like are provided on the front surface of the camera body 150; and a shutter release button 122, a shutter speed dial 123, an exposure compensation dial 124, a power lever 125, and a built-in flash 130 are mainly provided on the upper surface of the camera body 150.

Further, a monitor 116, an eyepiece part 126 of the optical finder, a MENU/OK key 127, a cross key 128, a play button 129, and the like are mainly provided on the back surface of the camera body 150 as shown in FIG. 12.

The monitor 116 functions as a display unit that displays various menu screens in addition to displaying a live view image in an imaging mode and playing back and displaying a taken image in a playback mode. The MENU/OK key 127 is an operation key having both a function as a menu button for giving a command to display a menu on the screen of the monitor 116 and a function as an OK button for giving a command to determine and perform selected contents and the like. The cross key 128 is an operation part that is used to input instructions in four directions of an upward direction, a downward direction, a left direction, and a right direction, and functions as a button that is used to select an item from the menu screen or is used to give an instruction to select various setting items from each menu. Further, an upper key and a lower key of the cross key 128 function as zoom switches at the time of imaging or play-zoom switches in the playback mode, and a left key and a right key thereof function as frame advance (fast-forward and rewind) buttons in the playback mode. The play button 129 is a button that is used to switch a mode to the playback mode where the monitor 116 is caused to display taken and recorded static images or videos.

In a case where the lens barrel according to this embodiment is used as an interchangeable lens for such a camera system, the movement of the third front lens group-holding frame 24B can be prevented while the lens barrel and the imaging device are transported in a state where power is turned off. Accordingly, damage to optical members can be prevented.

EXPLANATION OF REFERENCES

1: interchangeable lens
7: zoom ring
8: focus ring
9: stop ring
10: lens barrel body
12: stationary barrel
12C: third lens group-driving straight movement groove
12D: fourth lens group-driving straight movement groove
14: cam barrel
14A: first lens group-driving cam groove
14B: second lens group-driving cam groove
14C: third lens group-driving cam groove
14D: fourth lens group-driving cam groove
14E: camera shake-correcting lens-driving cam groove
16: mount
16A: flange portion
16B: terminal
18: mount fixing screw
20: first lens group-holding frame
22: second lens group-holding frame
24: third lens group-holding frame
24A: third rear lens group-holding frame
24B: third front lens group-holding frame
26: fourth lens group-holding frame
26A: fourth lens group base-holding frame
26B: fourth lens group-movable holding frame
28: fifth lens group-holding frame
30: stop unit 32: first lens group-driving cam pin
34: second lens group-driving cam pin
36: third lens group-driving cam pin
38: fourth lens group-driving cam pin
48: first main shaft
50: first sub-shaft
52: first main guide portion
54: first sub-guide portion
56: first motor
56A: first magnet
56B: inner yoke
56C: first coil
56D: outer yoke
58: second motor
58A: second coil
58B: second magnet
58C: inner yoke
58D: outer yoke
68: second main shaft
70: second sub-shaft
72: second main guide portion
74: second sub-guide portion
76: balance weight
82: camera shake-correcting lens-holding frame
82A: camera shake-correcting lens base-holding frame
82B: camera shake-correcting lens-movable holding frame
84: camera shake-correcting lens-driving cam pin
86: steel ball
88: spring
90: Y-axis motor
90A: magnet
90B: yoke
90C: coil
90D: yoke
100: exterior body
110: camera system
116: monitor
120: finder window
122: shutter release button
123: shutter speed dial
124: exposure compensation dial
125: power lever
126: eyepiece part
127: MENU/OK key
128: cross key
129: play button
130: built-in flash
150: camera body
160: body mount
210: third front lens group-drive unit
212: third front lens group-position detection unit
214: fourth lens group-drive unit
216: fourth lens group-position detection unit
218: stop drive unit
220: temperature detection unit
222: focus operation detection unit
224: zoom setting detection unit
226: stop setting detection unit
228: lens controller
230: camera controller
G1: first lens group
G2: second lens group
G3: third lens group
G3a: third front lens group
G3b: third rear lens group
G4: fourth lens group
G5: fifth lens group
AL1: movement locus of first lens group caused by zooming
AL2: movement locus of second lens group caused by zooming
AL3: movement locus of third lens group caused by zooming
AL4: movement locus of fourth lens group caused by zooming
Sim: image plane
St: stop

What is claimed is:

1. A lens barrel comprising:
a stationary frame including a first frame body and a second frame body;
a first movable frame that is configured to hold a first optical member and is supported by the first frame body so as to be movable in a direction of an optical axis of the first optical member;
a first drive unit including a first magnet provided to the first movable frame and a first coil provided to the first frame body, the first drive unit configured to move the first movable frame in the direction of the optical axis of the first optical member;
a second movable frame that is configured to hold a second optical member and is supported by the second frame body so as to be movable in a direction of an optical axis of the second optical member or in a direction orthogonal to the optical axis of the second optical member; and
a second drive unit including a second coil provided to the second movable frame, and a second magnet provided to the second frame body and a yoke which is made of magnetic body and fixed to the second magnet, the second drive unit configured to move the second movable frame in the direction of the optical axis of the second optical member or in the direction orthogonal to the optical axis of the second optical member,
wherein, in a case where the first movable frame is moved to a moving end close to the second drive unit and application of current to the first coil is stopped, the first movable frame is fixed at the moving end by a magnetic force between the first magnet provided to the first movable frame and the yoke provided to the second frame body,
the second movable frame is a barrel body that is supported by the stationary frame so as to be movable in the direction of the optical axis of the second optical member and has a cavity on a side thereof facing the first movable frame, and
the first movable frame enters the cavity of the second movable frame in a case where the first movable frame is moved to the moving end close to the second drive unit.

2. The lens barrel according to claim 1,
wherein the first drive unit is a moving magnet type voice coil motor and the second drive unit is a moving coil type voice coil motor.

3. The lens barrel according to claim 1,
wherein the second movable frame is supported by the stationary frame so as to be movable in the direction orthogonal to the optical axis of the second optical member, and
the second optical member is a camera shake-correcting lens.

4. The lens barrel according to claim 1,
wherein the first movable frame is a barrel body, and
a plurality of the first magnets are arranged symmetrically with respect to a center of the first movable frame.

5. The lens barrel according to claim 1, wherein the second movable frame includes a balance weight on a side thereof facing the first movable frame, the balance weight is formed of a magnetic body, and the second movable frame is fixed by a magnetic force between the first magnet and the balance weight in a case where application of current to the first coil is stopped.

6. An imaging device comprising:

the lens barrel according to claim 1.

* * * * *